(12) United States Patent
Okawa et al.

(10) Patent No.: US 8,175,407 B2
(45) Date of Patent: May 8, 2012

(54) IMAGE PROCESSING METHOD, IMAGE PROCESSING APPARATUS, AND PROGRAM FOR CLUSTERING DATA

(75) Inventors: Koji Okawa, Kawasaki (JP); Satoshi Naito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 287 days.

(21) Appl. No.: 12/697,413

(22) Filed: Feb. 1, 2010

(65) Prior Publication Data

US 2010/0202686 A1 Aug. 12, 2010

(30) Foreign Application Priority Data

Feb. 10, 2009 (JP) ................................. 2009-029116

(51) Int. Cl.
*G06K 9/62* (2006.01)
*G06K 9/00* (2006.01)
*G06K 9/68* (2006.01)
*G06K 9/54* (2006.01)

(52) U.S. Cl. ........ 382/255; 382/165; 382/164; 382/218; 382/187; 382/305

(58) Field of Classification Search ................... 382/225, 382/187, 165, 164, 107, 218
See application file for complete search history.

(56) References Cited

U.S. PATENT DOCUMENTS

| 5,263,120 | A | * | 11/1993 | Bickel | 706/62 |
| 5,999,647 | A | * | 12/1999 | Nakao et al. | 382/187 |
| 6,005,625 | A | * | 12/1999 | Yokoyama | 375/240.16 |
| 6,338,062 | B1 | * | 1/2002 | Liu | 1/1 |
| 6,701,010 | B1 | | 3/2004 | Katsuyama | |
| 7,623,712 | B2 | | 11/2009 | Dai et al. | |
| 7,697,758 | B2 | * | 4/2010 | Vincent et al. | 382/177 |
| 2002/0027561 | A1 | * | 3/2002 | Wu | 345/593 |
| 2005/0100212 | A1 | * | 5/2005 | Eguchi et al. | 382/164 |
| 2009/0138465 | A1 | * | 5/2009 | Masuyama et al. | 707/5 |
| 2010/0064254 | A1 | * | 3/2010 | Atsmon et al. | 715/810 |
| 2010/0134657 | A1 | * | 6/2010 | Tsujii et al. | 348/231.2 |
| 2010/0202685 | A1 | * | 8/2010 | Naito | 382/164 |
| 2011/0026853 | A1 | * | 2/2011 | Gokturk et al. | 382/305 |
| 2011/0103700 | A1 | * | 5/2011 | Haseyama | 382/225 |

FOREIGN PATENT DOCUMENTS

| JP | 11-288465 | 10/1999 |
| JP | 2007-158725 | 6/2007 |
| JP | 2008-42345 | 2/2008 |

\* cited by examiner

*Primary Examiner* — Vu Le
*Assistant Examiner* — Ha Le
(74) *Attorney, Agent, or Firm* — Fitzpatrick, Cella, Harper & Scinto

(57) ABSTRACT

A clustering unit calculates, for clusters in a descending order of the number of pixels belonging thereto, a distance from a feature vector of a processing object pixel and a representative feature vector of an object cluster, and compares the distance with a first threshold. The processing object pixel is stored in a memory or the like as a pixel belonging to an object cluster when the distance is determined to be less than or equal to the first threshold.

17 Claims, 16 Drawing Sheets

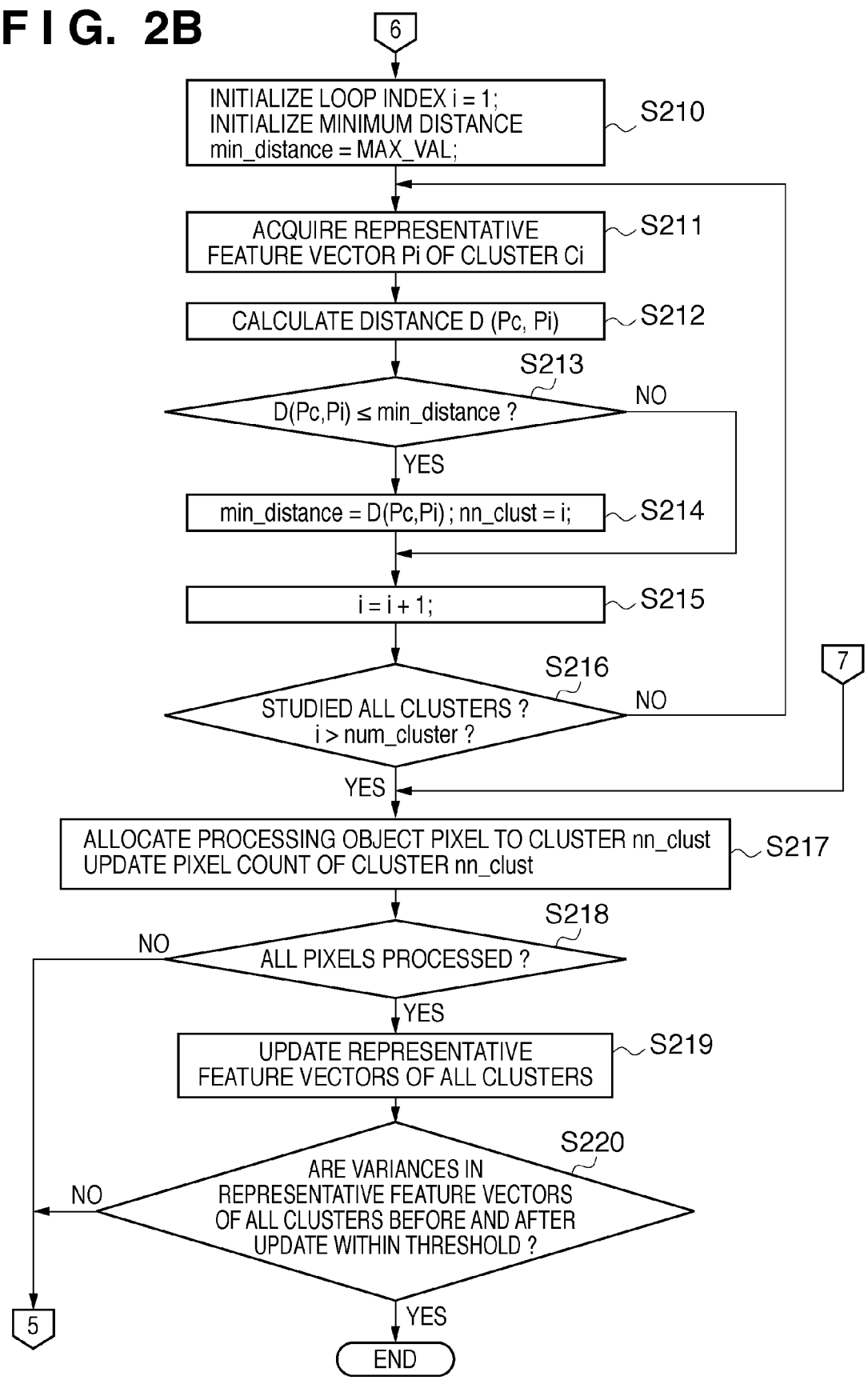

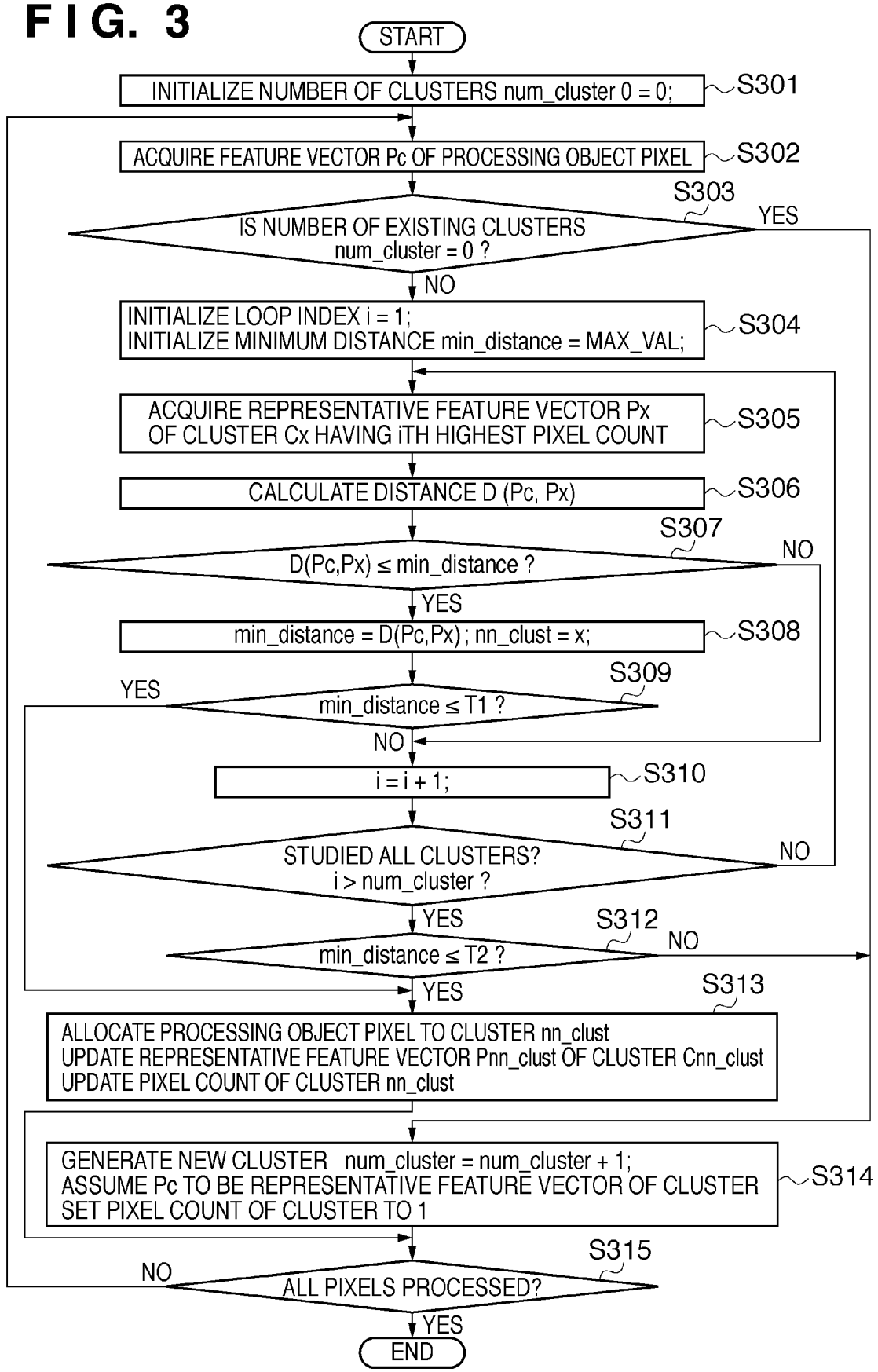

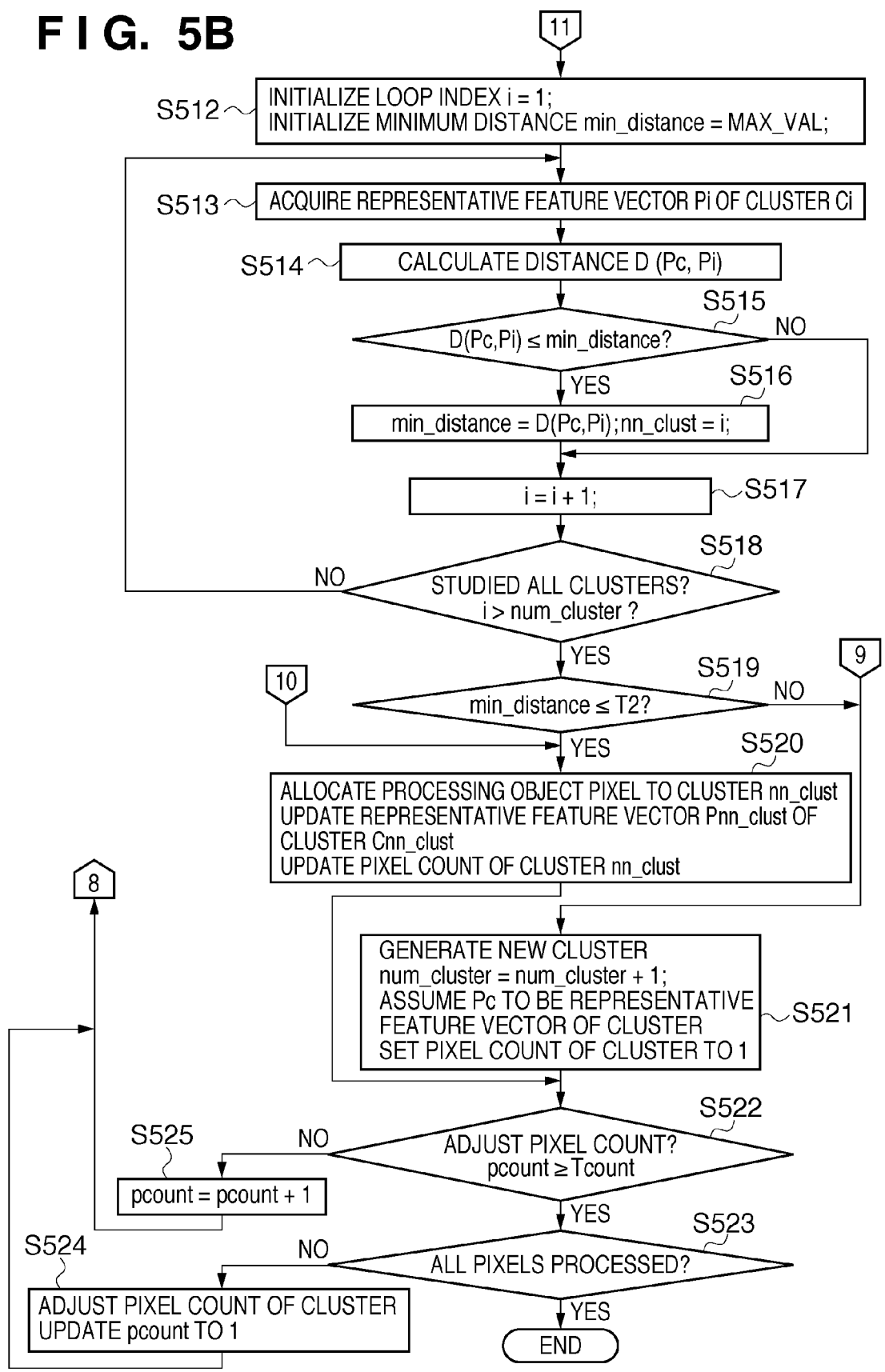

| CLUSTER NUMBER | REPRESENTATIVE FEATURE VECTOR OF CLUSTER | NUMBER OF PIXELS BELONGING TO CLUSTER |
|---|---|---|
| 1 | ☐ | 151 |
| 2 | ▨ | 24 |
| 3 | ▓ | 1 |
| 4 | ▧ | 18 |
| 5 | ▨ | 10 |

FIG. 11A

| 10 | 10 | 10 | 31 | 31 |
|----|----|----|----|----|
| 9  | 11 | 29 | 29 | 60 |
| 90 | 91 | 89 | 90 | 60 |

| 10 | 10 | 10 | 31 | 31 | 1102
|----|----|----|----|----|
| 9  | 11 | 29 | 29 | 60 | 1105
| 90 | 91 | 89 | 90 | 60 | 1103

FIG. 11C

| 10 | 10 | 10 | 31 | 31 |
|----|----|----|----|----|
| 9  | 11 | 29 | 29 | 60 |
| 90 | 91 | 89 | 90 | 60 |

FIG. 11D

| 10 | 10 | 10 | 31 | 31 |
|----|----|----|----|----|
| 9  | 11 | 29 | 29 | 60 |
| 90 | 91 | 89 | 90 | 60 |

| 0 | 1 | 1 | 1 | 1 |
|---|---|---|---|---|
| 1 | 1 | 1 | 1 | 1 |
| 1 | 1 | 1 | 1 | 1 |
| 2 | 3 | 3 | 3 | 3 |
| 3 | 3 | 3 | 3 | 3 |
| 3 | 3 | 3 | 3 | 3 |

| 0 | 1 | 1 | 1 | 1 |
|---|---|---|---|---|
| 1 | 1 | 1 | 1 | 1 |
| 1 | 1 | 1 | 1 | 1 |
| 2 | 1 | 1 | 1 | 1 |
| 1 | 1 | 1 | 1 | 1 |
| 1 | 1 | 1 | 1 | 1 |

| 0 | 1 | 1 | 1 | 1 |
|---|---|---|---|---|
| 1 | 1 | 1 | 1 | 1 |
| 1 | 1 | 1 | 1 | 1 |
| 2 | 3 | 3 | 1 | 1 |
| 1 | 1 | 1 | 1 | 1 |
| 1 | 1 | 1 | 1 | 1 |

IMAGE PROCESSING METHOD, IMAGE PROCESSING APPARATUS, AND PROGRAM FOR CLUSTERING DATA

BACKGROUND OF THE INVENTION

1. Field of the Invention

The present invention relates to an image processing method, an image processing apparatus, and a program for performing clustering on image data.

2. Description of the Related Art

In recent years, there has been a growing demand for saving or sending documents in computerized forms instead of in paper form. The term "computerization of a document," as used herein, is not simply limited to reading a paper document by a scanner and the like to obtain image data. For example, image data is separated into regions of different properties such as characters, diagrams, photographs, and tables which make up a document. Accordingly, a computerization process of a document involves converting a region into data of an optimal format, such as converting a character region into character codes, converting a diagram region into vector data, converting a background region or a photograph region into bitmap data, and converting a table region into structural data.

As an example of a method of conversion to vector data, Japanese Patent Laid-Open No. 2007-158725 discloses an image processing apparatus. With the disclosed image processing apparatus, region splitting is performed by clustering, contours of respective regions are extracted, and the extracted contours are converted into vector data.

Known methods of splitting an image into regions by clustering include a nearest-neighbor clustering method and a K-means clustering method.

The nearest-neighbor clustering method involves comparing a feature vector of a processing object pixel with representative feature vectors of respective clusters to find a cluster having a feature vector whose distance therefrom is a minimum. If the distance is less than or equal to a predetermined threshold, the processing object pixel is allocated to the corresponding cluster. If not, a new cluster is defined and the processing object pixel is allocated to the new cluster. Color information (pixel values comprising R, G, and B) is generally used as feature vectors. A center of gravity of a cluster is generally used as a representative feature vector of the cluster. In other words, a representative feature vector of a cluster is a mean value of feature vectors (color information) of the respective pixels allocated to the cluster.

The K-means clustering method involves defining, in advance, K-number of clusters and representative feature vectors thereof, and allocating each pixel to a cluster whose distance from a feature vector is a minimum. After processing on all pixels is completed, the representative feature vector of each cluster is updated. The above processing operation is repeated until the differences in representative feature vectors before and after the update equals or falls below a predetermined value.

Both the nearest-neighbor clustering method and the K-means clustering method involve a process for finding a cluster having a representative feature vector whose distance from a feature vector of a processing object pixel is a minimum from among all clusters. In other words, distances from the representative feature vectors of all clusters must be calculated for each pixel. Consequently, calculation time problematically increases when the number of clusters is increased in order to improve region-splitting accuracy.

As a conventional technique for solving the problem described above, for example, Japanese Patent Laid-Open No. 11-288465 discloses a color image processing apparatus. With the conventional technique, clustering is performed based on feature vectors (color information) of a processing object pixel and an adjacent pixel. Subsequently, clusters are grouped based on color information and geometry information of the clusters. In this case, geometry information refers to coordinate information representing the proximity between regions, and the like.

However, since the conventional techniques require that a cluster be newly defined and a pixel of interest be allocated to the newly-defined cluster when the distance between feature vectors of a processing object pixel and an adjacent pixel is large, a large number of clusters ends up being defined. Consequently, the processing time required by grouping problematically increases.

SUMMARY OF THE INVENTION

In consideration of the above, the present invention provides an image processing method that enables clustering to be performed at a high speed.

In order to solve the problems described above, the present invention provides an image processing method that clusters image data per pixel using a computer. The method includes: a first attribution determining step of comparing, by setting predefined clusters in a descending order of the number of pixels belonging thereto as objects, a first distance that is the distance between a feature vector of a processing object pixel and a representative feature vector of an object cluster with a first threshold, and storing the processing object pixel in a memory as a pixel belonging to the object cluster when it is determined that the first distance is less than or equal to the first threshold; a second attribution determining step of comparing, when it is determined in the first attribution determining step that there are no clusters for which the first distance is less than or equal to the first threshold, a second distance that is a minimum value among distances between the feature vector of the processing object pixel and respective representative feature vectors of the predefined clusters with a second threshold, and storing the processing object pixel in the memory as a pixel belonging to a cluster corresponding to the second distance when the second distance is less than or equal to the second threshold; and a third attribution determining step of defining a new cluster when the processing object pixel has not been stored as a pixel belonging to any of the predefined clusters in the first attribution determining step and the second attribution determining step, and storing the processing object pixel in the memory as a pixel belonging to the new cluster.

Alternatively, according to another aspect, the present invention is an image processing method that clusters image data per pixel to any of a plurality of predefined clusters using a computer. The method includes: a first attribution determining step of comparing, by setting the plurality of clusters in a descending order of the number of pixels belonging thereto as objects, a first distance that is the distance between a feature vector of a processing object pixel and a representative feature vector of an object cluster with a first threshold, and storing the processing object pixel in a memory as a pixel belonging to the object cluster when it is determined that the first distance is less than or equal to the first threshold; and a second attribution determining step of storing the processing object pixel in the memory as a pixel belonging to a cluster for which the distance between the feature vector of the processing object pixel and a representative feature vector of the cluster takes a minimum value among the plurality of clusters when it is determined in the first attribution determining step that there are no clusters for which the first distance is less than or equal to the first threshold.

According to the present invention, in a descending order of the numbers of pixels belonging to clusters, distances between a feature vector of a processing object pixel and representative feature vectors of the clusters are compared with a first threshold. The processing object pixel is allocated to a cluster corresponding to a distance determined as being less than or equal to the first threshold, and the processing of the pixel is concluded. Consequently, since the number of distance calculations can be reduced as compared to conventional methods, region splitting can now be performed at high speeds.

Further features of the present invention will become apparent from the following description of exemplary embodiments with reference to the attached drawings.

BRIEF DESCRIPTION OF THE DRAWINGS

FIG. 2A and FIG. 2B are flowcharts illustrating operations of an image processing method according to a second embodiment;

FIG. 3 is a flowchart illustrating operations of an image processing method according to a third embodiment;

FIG. 5A and FIG. 5B are flowcharts illustrating operations of an image processing method according to a fifth embodiment;

FIG. 11A, FIG. 11B, FIG. 11C, and FIG. 11D are diagrams illustrating the accuracy of the image processing method according to the first embodiment;

FIG. 12A and FIG. 12B are diagrams illustrating the numbers of distance calculations in the image processing method according to the second embodiment;

FIG. 13 is a diagram illustrating the numbers of distance calculations in the image processing method according to the third embodiment;

FIG. 16A, FIG. 16B, and FIG. 16C are diagrams illustrating the numbers of distance calculations in the image processing method according to the fifth embodiment; and FIG. 17 is a diagram illustrating the numbers of distance calculations in the image processing method according to the sixth embodiment.

DESCRIPTION OF THE EMBODIMENTS

<First Embodiment>

An image processing method according to a first embodiment of the present invention and a configuration of a vector data converting apparatus using the image processing method will now be described with reference to FIG. 7. Clusters to which pixels belong are retained in a memory or the like as, for example, bitmap data having attributes associated with the respective pixels. Therefore, "a pixel allocated to a cluster" means that identification information of the cluster is written or saved as information indicating the cluster to which the pixel is allocated among attributes associated to the pixel.

Figure 7:
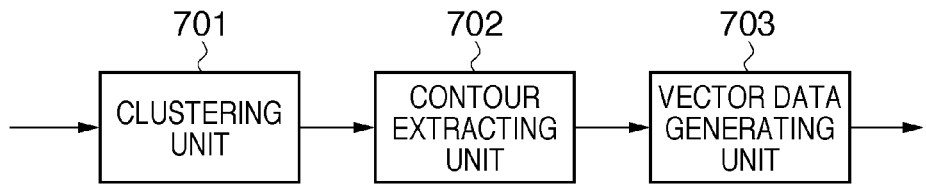
FIG. 7 is a block diagram illustrating a configuration of a vector data converting apparatus.

In FIG. 7, reference numeral 701 denotes a clustering unit that applies the image processing method according to the present embodiment to perform region splitting on an image. Image data is inputted per pixel to the clustering unit 701 in a raster scan order starting from a top left pixel. Reference numeral 702 denotes a contour extracting unit that extracts a contour of each region split by the clustering unit 701. Reference numeral 703 denotes a vector data generating unit that generates vector data based on the contour extracted by the contour extracting unit 702. The configuration illustrated in FIG. 7 represents a software module realized when, for example, a program is executed by a computer. The computer may be a general-purpose computer or an embedded computer built into a digital multifunctional machine or the like. The configuration of the computer system is a basic configuration that includes a processor, a main memory, a file storage memory, a user interface, and an interface between the computer system and an external device (e.g., scanner). Image data of a processing object according to the present embodiment is image data stored in a file storage memory or, for example, image data read by a scanner or received from another computer connected by communication.

A file storage memory and a main memory may also be collectively referred to simply as a memory. In addition, the program to be executed, including those to be executed in the other embodiments, is a program that includes the procedures illustrated in FIG. 1A to FIG. 6B.

Operations of the clustering unit 701 will now be described in detail with reference to the flowcharts illustrated in FIGS. 1A and 1B.

A variable num_cluster representing the number of clusters is initialized to 0 (step S101). A feature vector Pc of a pixel that is a clustering object (hereinafter referred to as a "processing object pixel") is acquired (step S102). In the image processing method according to the present embodiment, an RGB color space is assumed as a feature space. In other words, an RGB value of a pixel becomes a feature vector of the pixel. However, an image processing method according to the present invention is not limited to this arrangement. For example, a pixel value in a YUV color space may be used as a feature vector.

A determination is made on whether or not one or more clusters are predefined (step S103). If the number of predefined clusters is zero, (YES in step S103), the processing proceeds to step S120 to be described later. If there are predefined clusters (NO in step S103), comparisons between representative feature vectors of a maximum of N-number of clusters and the feature vector of the processing object pixel are sequentially performed starting at a cluster having the greatest number of pixels belonging thereto (steps S104 to S110). Hereinafter, the number of pixels belonging to a cluster will be referred to as a "pixel count". A pixel count is retained as, for example, a variable associated with each cluster. Every time a cluster to which a pixel of interest belongs is determined, the pixel count of the cluster to which the pixel belongs is updated. In addition, the process of sequentially performing comparisons between representative feature vectors of a maximum of N-number of clusters and the feature vector of the processing object pixel starting at a cluster having the highest pixel count will be referred to as an "advance comparison". In other words, in an advance comparison, clusters up to the Nth cluster in a descending order of the number of pixels belonging thereto become comparison object clusters.

While the value of N is set to 1 in the image processing method according to the present embodiment, an image processing method according to the present invention is not limited to this arrangement. Alternatively, a value of 2 or greater may be used as N, or the value of N may be altered during processing. For example, a value equivalent to ½ or ¼ of the value of the number of predefined clusters num_cluster may be set to N. In addition, a mean value of feature vectors of pixels belonging to a cluster is to be used as the representative feature vector of the cluster.

The advance-comparison process (steps S104 to S110) will now be described in detail. A loop index j is initialized to 1 (step S104). A representative feature vector Px of a cluster Cx having the jth highest pixel count is acquired (step S105). A distance D (Pc, Px) between Pc and Px is calculated (step S106). While a Euclidean distance is to be calculated as a distance D in the image processing method according to the present invention, an image processing method according to the present invention is not limited thereto and, for example, a Manhattan distance can be calculated instead. D (Pc, Px) is compared with a threshold T1 that is a first threshold (step S107). If D (Pc, Px) is less than or equal to T1 or, in other words, less than or equal to the first threshold (YES in step S107), the value of a variable nn_clust representing a cluster number of a cluster to which the processing object pixel should belong is updated to a cluster number x (step S110). The processing operation then proceeds to step S119 to be described later. If the value of D (Pc, Px) is greater than T1 (NO in step S107), a judgment is made on whether comparisons with the N-number of clusters have been completed (step S108). If not (NO in step S108), the loop index j is updated (step S109), and processing returns to step S105.

If there are no clusters whose value of the distance D (Pc, Px) to the processing object pixel is less than or equal to T1 among the N-number of clusters (YES in step S108), the processing proceeds to step S111. Steps S111 to S117 are processes for comparing representative feature vectors of all clusters with the feature vector of the processing object pixel and finding a cluster having a nearest representative feature vector. Hereinafter, these processes will be referred to as a "full search".

A full search will now be described in detail. A loop index i and a variable min_distance are initialized (step S111). min_distance is a variable representing a minimum value among the distances between the feature vector of the processing object pixel and the representative feature vectors of the respective clusters. A value MAX_VALUE that is greater than the maximum possible distance in the feature space is set as an initial value of min_distance. A representative feature vector Pi of a cluster Ci is acquired (step S112). A distance D (Pc, Pi) between Pc and Pi is calculated (step S113). The value of D (Pc, Pi) is compared with the value of min_distance (step S114).

If D (Pc, Pi) is less than or equal to min_distance (YES in step S114), the value of min_distance is updated to D (Pc, Pi) and the value of nn_clust is updated to a cluster number i (step S115). The loop index i is updated (step S116). If the value of D (Pc, Pi) is greater than min_distance (NO in step S114), the processing proceeds to step S116. In step S117, a judgment is made on whether or not comparisons with all clusters have been completed. If not (NO in step S117), the processing returns to step S112. If comparisons with all clusters have been completed (YES in step S117), the processing proceeds to step S118. At this stage, the value of min_distance represents a distance between the feature vector of the processing object pixel and a representative feature vector of a nearest cluster (i.e., second distance). In addition, nn_clust is an identifier of a cluster corresponding to the second distance and is a candidate cluster to which the processing object pixel is to be allocated among predefined clusters.

In step S118, the value of min_distance is compared with the value of threshold T2 that is the second threshold. The threshold T2 is a value used to determine whether to define a new cluster or to allocate the processing object pixel to a predefined cluster.

If min_distance is less than or equal to T2 or, in other words, less than or equal to the second threshold (YES in step S118), the processing object pixel is allocated to the cluster nn_clust and the representative feature vector and the pixel count are updated (step S119). Allocating a pixel to a cluster refers to a process of associating the pixel with the cluster such as associating an identifier of a cluster to which a processing object pixel belongs to the pixel and saving the identifier. Step S119 operates as a first attribution determining step when operation thereof branches from step S110, and as a second attribution determining step when operation thereof branches from step S118. The processing operation next proceeds to step S121. If min_distance is greater than T2 (NO in step S118), a new cluster having the feature vector of the processing object pixel as a representative feature vector is generated (i.e., defined) (step S120), and the processing object pixel is allocated to the new cluster. This step operates as a third attribution determining step. Subsequently, the processing operation proceeds to step S121. The generation of a new cluster is performed by, for example, registering the identifier of a cluster in an existing cluster list or the like. In step S121, a judgment is made on whether or not processing on all pixels has been completed. If so (YES in step S121), processing of the clustering unit 701 is concluded. If not (NO in step S121), the processing returns to step S102 to set a subsequent pixel as a processing object pixel.

Figures 8A, 8B:
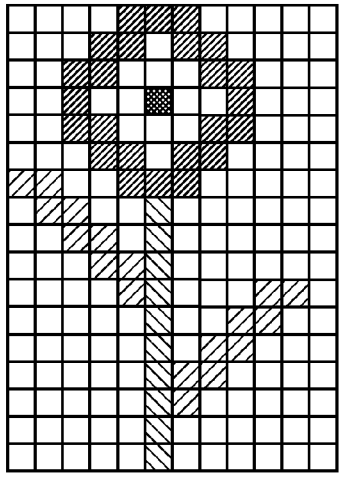
FIG. 8A, FIG. 8B, FIG. 8C, and FIG. 8D are diagrams illustrating the numbers of distance calculations in the image processing method according to the first embodiment.

Advantages of the image processing method according to the present embodiment will be described with reference to an image illustrated in FIG. 8A. The image illustrated in FIG. 8A is made up of 18 vertical pixels and 13 horizontal pixels for a total of 18×13=204 pixels. FIG. 8B illustrates information on each cluster after clustering is performed on the image illustrated in FIG. 8A.

Figures 8C, 8D:

FIG. 8C illustrates the number of distance calculations per pixel when a conventional nearest neighbor clustering method is applied. With a conventional method, distances between the feature vector of the processing object pixel and the representative feature vectors of all predefined clusters must be compared. Accordingly, FIG. 8C shows that a conventional method requires 809 distance calculations.

On the other hand, in the image processing method according to the present embodiment, the representative feature vectors of N-number of clusters having high pixel counts are first compared with the feature vector of the processing object pixel. FIG. 8D illustrates the number of distance calculations per pixel when the image processing method according to the present embodiment is applied to the image illustrated in FIG. 8A while setting N=1. In the image illustrated in FIG. 8A, a cluster assigned number 1 (hereinafter referred to as cluster 1)

is the cluster that consistently has the highest pixel count throughout the entire process. Therefore, the cluster is to be set as an advance comparison object cluster. Over the entire image, a total of 151 pixels belong to the cluster 1. Since the pixel to be processed first (top left corner of the image) is determined to be YES in step S103 and proceeds to step S120, a distance calculation will not be performed thereon. As for the remaining 150 pixels, since clusters to which the pixels belong are to be determined by advance comparison in one distance calculation, the number of distance calculations is 150. As for pixels belonging to other clusters, a full search is to be performed after advance comparison. k-number of distance calculations is performed per pixel by full search from the moment a cluster k is defined until the moment a cluster k+1 is defined. For example, with a pixel belonging to a cluster 2 which exists between the moment cluster 2 is defined until the moment a cluster 3 is defined, a total of three distance calculations, including one during an advance comparison and two during a full search, are performed. Accordingly, the number of distance calculations when the entire image is processed can be obtained from FIG. 8D as 401. In addition, when the number of clusters N to be subjected to advance comparison is set to 2, the number of distance calculations is 393.

Figures 9, 10:
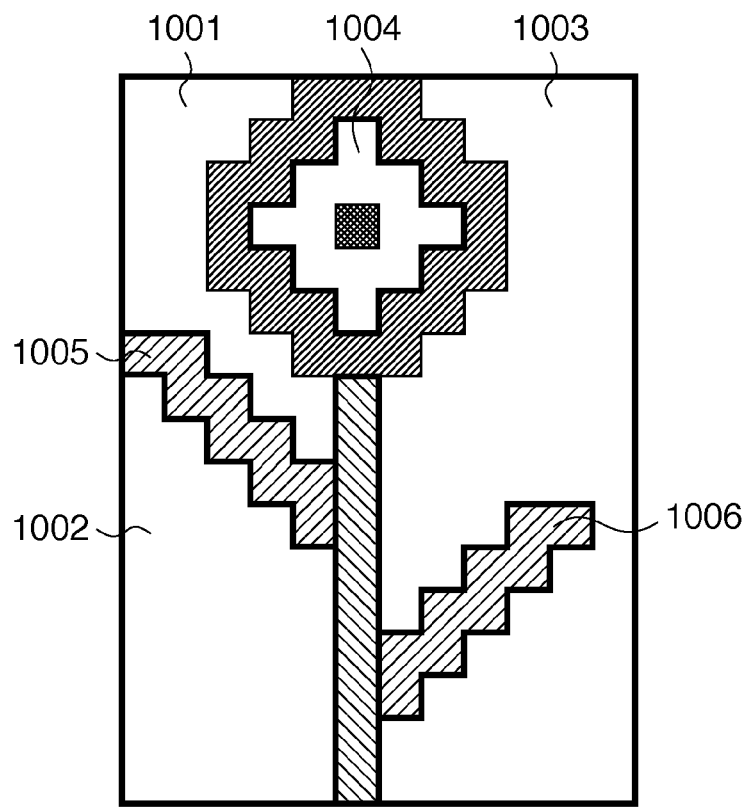
FIG. 9 is a diagram illustrating the numbers of distance calculations when altering the number of clusters N to be subjected to advance comparison.
FIG. 10 is a diagram illustrating region splitting according to image processing methods of conventional art and of the first embodiment.

Furthermore, advantages when altering the value of N according to the number of predefined clusters num_cluster will be described with reference to FIG. 9. FIG. 9 illustrates the number of distance calculations of each pixel when the value of N is set to a maximum integer satisfying N<num_cluster/2+1. From FIG. 9, it is shown that the number of distance calculations for the entire image is 337. The number of distance calculations in the image processing method according to the present embodiment has been reduced by more than half as compared to a conventional nearest neighbor clustering method. Therefore, clustering can be performed at a higher speed in comparison with a conventional method.

In addition, with the image processing method according to the present embodiment, when distances between N-number of clusters with high pixel counts and the processing object pixel are large, a full search (steps S111 to S117) is performed. Therefore, a processing object pixel can be allocated to an optimal cluster even without having to perform grouping according to the conventional art described in Japanese Patent Laid-Open No. 11-288465. For example, when clustering the image illustrated in FIG. 8A, with a conventional technique, regions denoted by reference numerals 1001 to 1006 illustrated in FIG. 10 are to be split into separate clusters. Subsequently, the regions denoted by reference numerals 1001 to 1004 and 1005 to 1006 are integrated by grouping into single clusters. On the other hand, in the image processing method according to the present embodiment, the regions denoted by reference numerals 1001 to 1004 and 1005 to 1006 are formed into single clusters upon conclusion of clustering.

Furthermore, with the image processing method according to the present embodiment, two thresholds with different values are used, namely the threshold T1 used during advance comparison and the threshold T2 used during full search. By setting T1 smaller than T2, high-speed clustering with high accuracy can be realized.

A specific example thereof will be described with reference to FIGS. 11A to 11D. For the sake of simplicity, a feature vector of an image illustrated in FIG. 11A is assumed to be one-dimensional. In addition, it is assumed that the numerical value of each pixel represents a value of a feature vector of the pixel. FIG. 11B illustrates a state where clustering has been completed up to a pixel 1101. At this point, a cluster 1 having a representative feature vector 10 (a cluster 1104 illustrated in FIG. 11B) to which the pixel 1101 belongs and a cluster 2 having a representative feature vector 31 (a cluster 1105 illustrated in FIG. 11B) to which the pixel 1102 belongs have been defined. Since the cluster 1 has the higher pixel count, the cluster 1 becomes the advance comparison object. FIG. 11C illustrates a result of clustering performed by setting both values of T1 and T2 to 20. The distance between the feature vector of the pixel 1103 and the representative feature vector of the cluster 1 is determined to be less than or equal to the threshold T1 (YES in step S107) and the pixel 1103 is stored as a pixel belonging to the cluster 1. In other words, the pixel 1103 is allocated to the cluster 1. On the other hand, when clustering is performed by setting the value of T1 smaller than the value of T2 (for example, setting T1=5, T2=20), a result such as that illustrated in FIG. 11D is obtained. The distance between the feature vector of the pixel 1103 and the representative feature vector of the cluster 1 is determined to be greater than the threshold T1 (NO in step S107). Therefore, the pixel 1103 is stored as a pixel belonging to the cluster 2 having a representative feature vector that is nearer than that of the cluster 1. In other words, the pixel 1103 is allocated to the cluster 2. Accordingly, high-speed clustering with a high accuracy can be achieved.

Figure 1A:
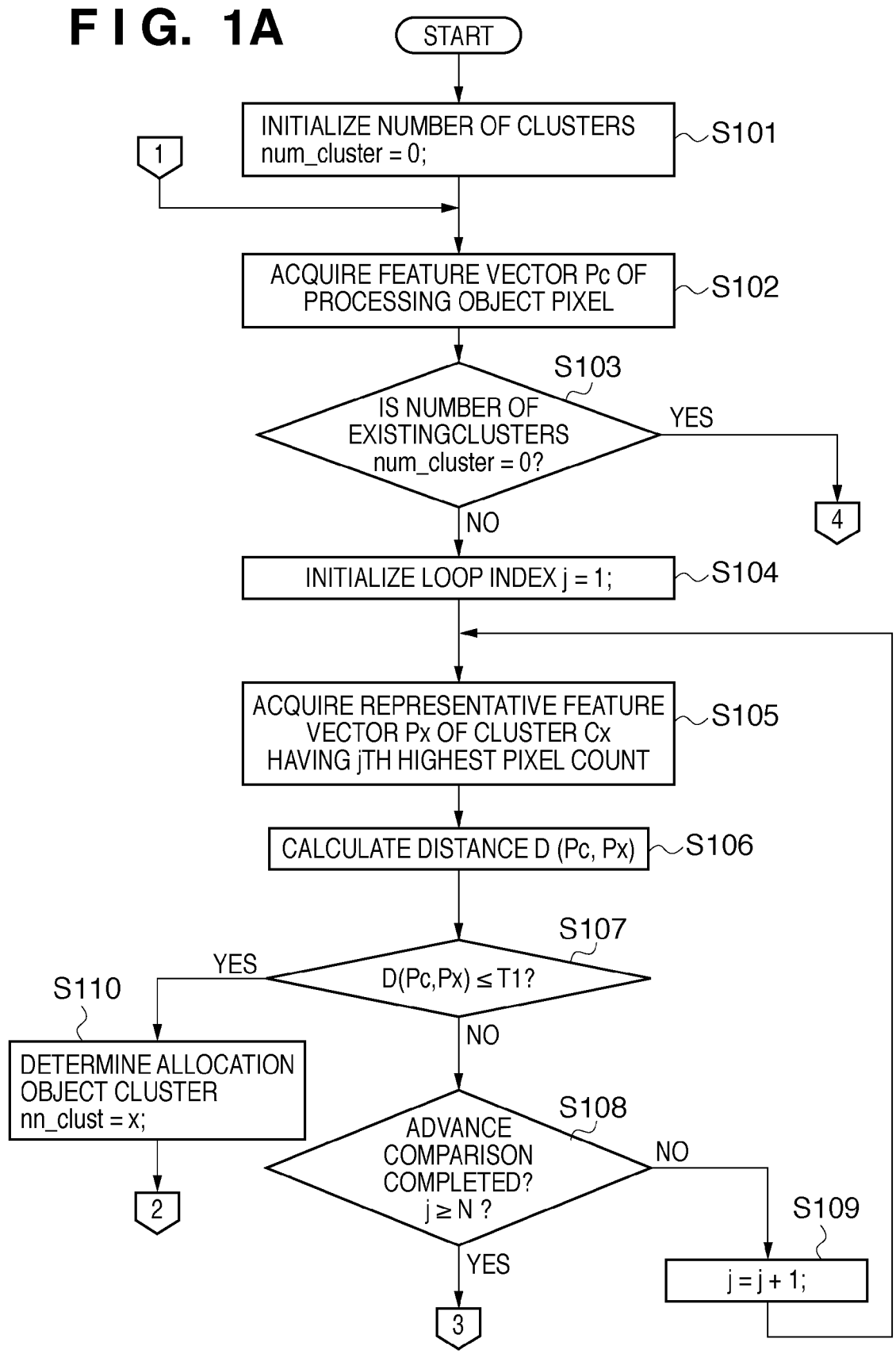
FIG. 1A and FIG. 1B are flowcharts illustrating operations of an image processing method according to a first embodiment.
Figure 1B:
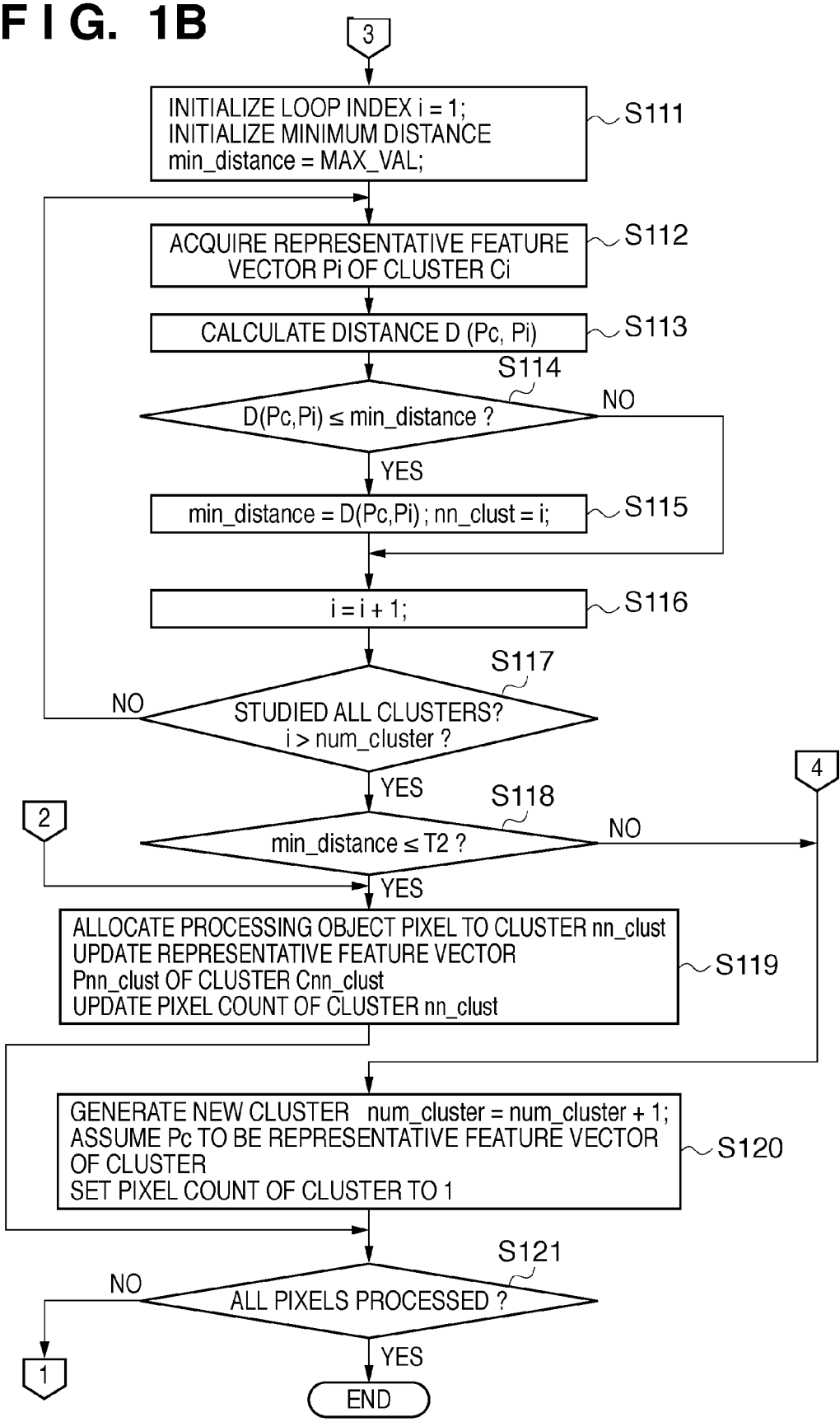
Figure 2A:
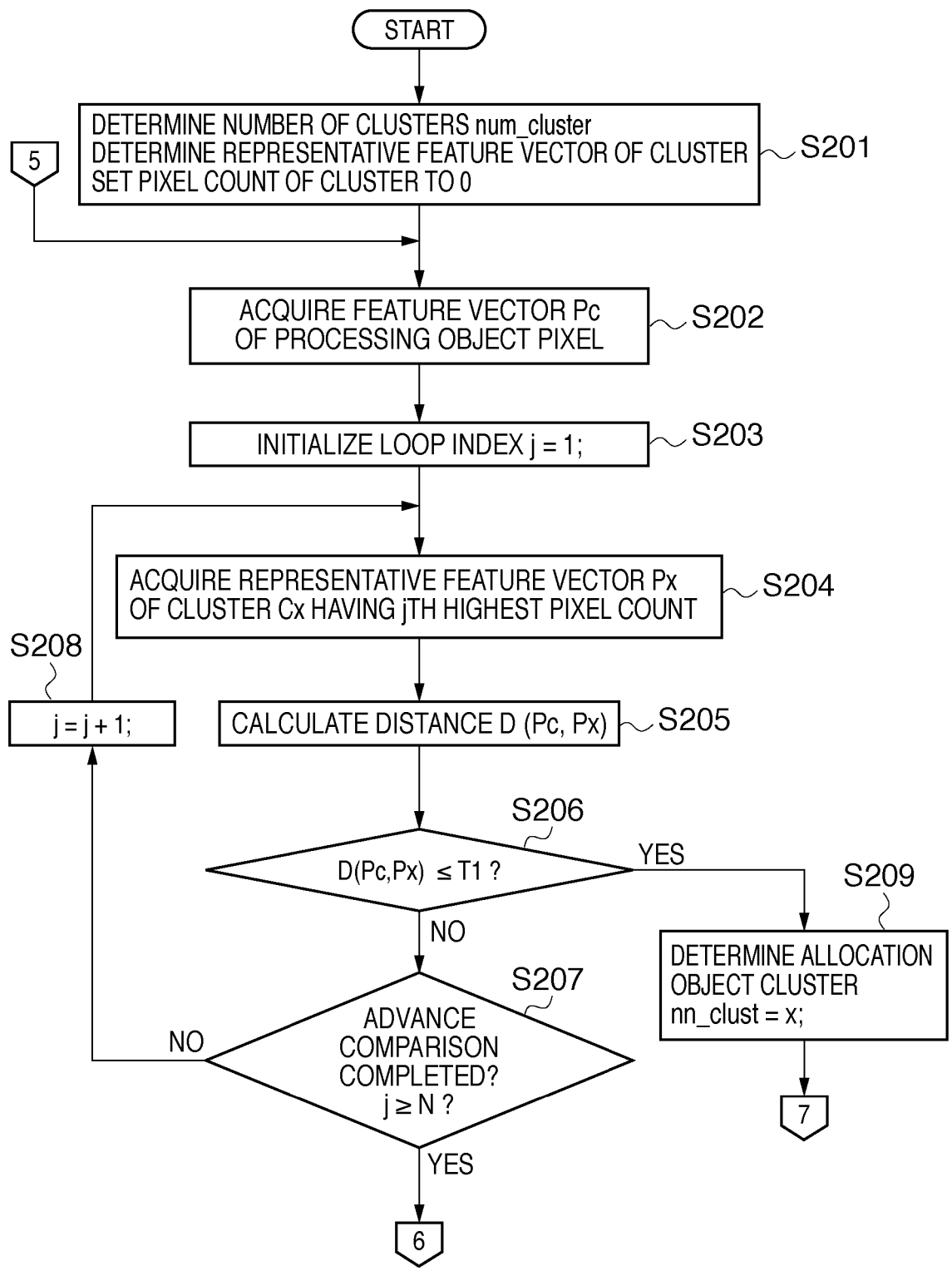
Figure 4:
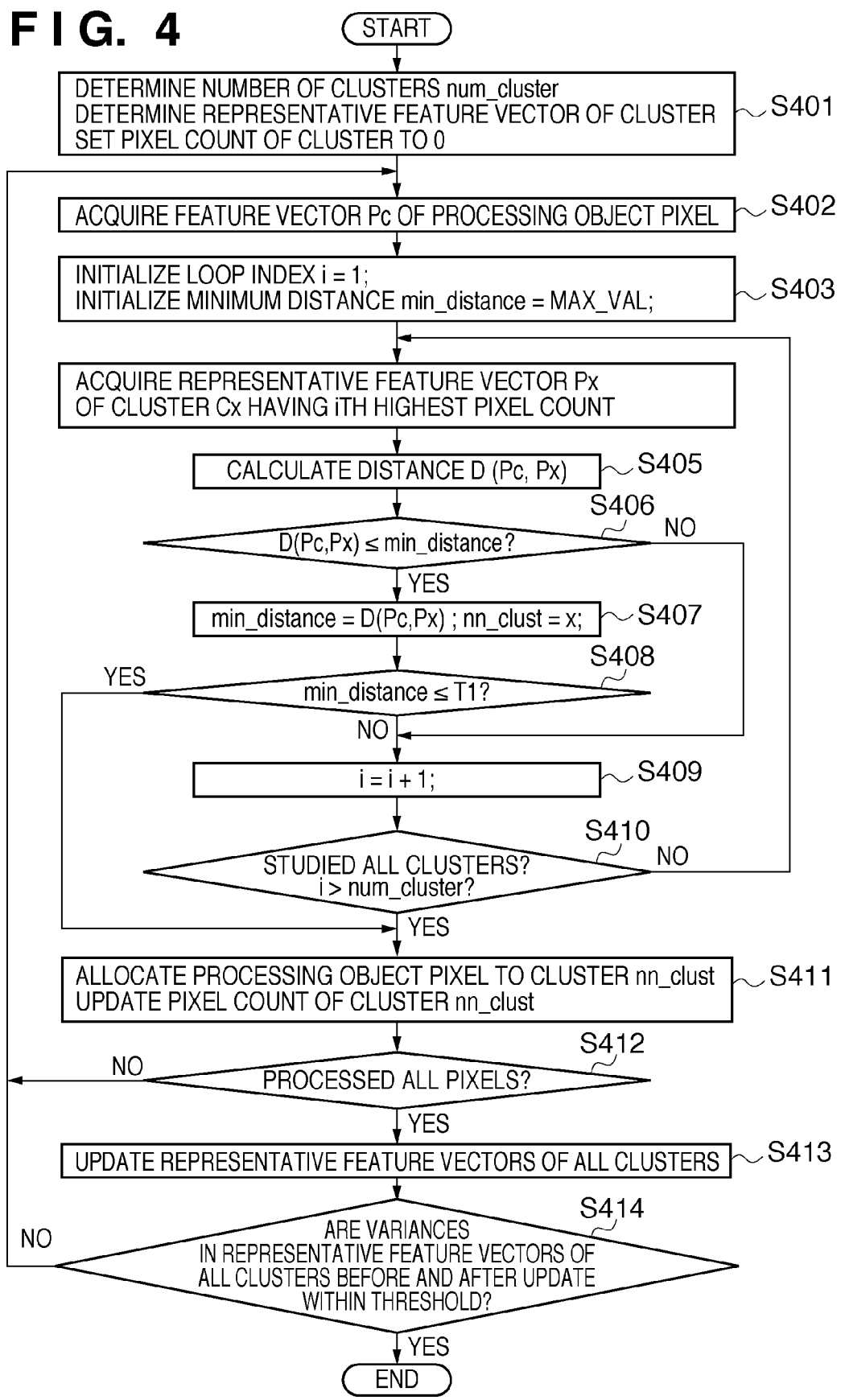
FIG. 4 is a flowchart illustrating operations of an image processing method according to a fourth embodiment.
Figure 5A:
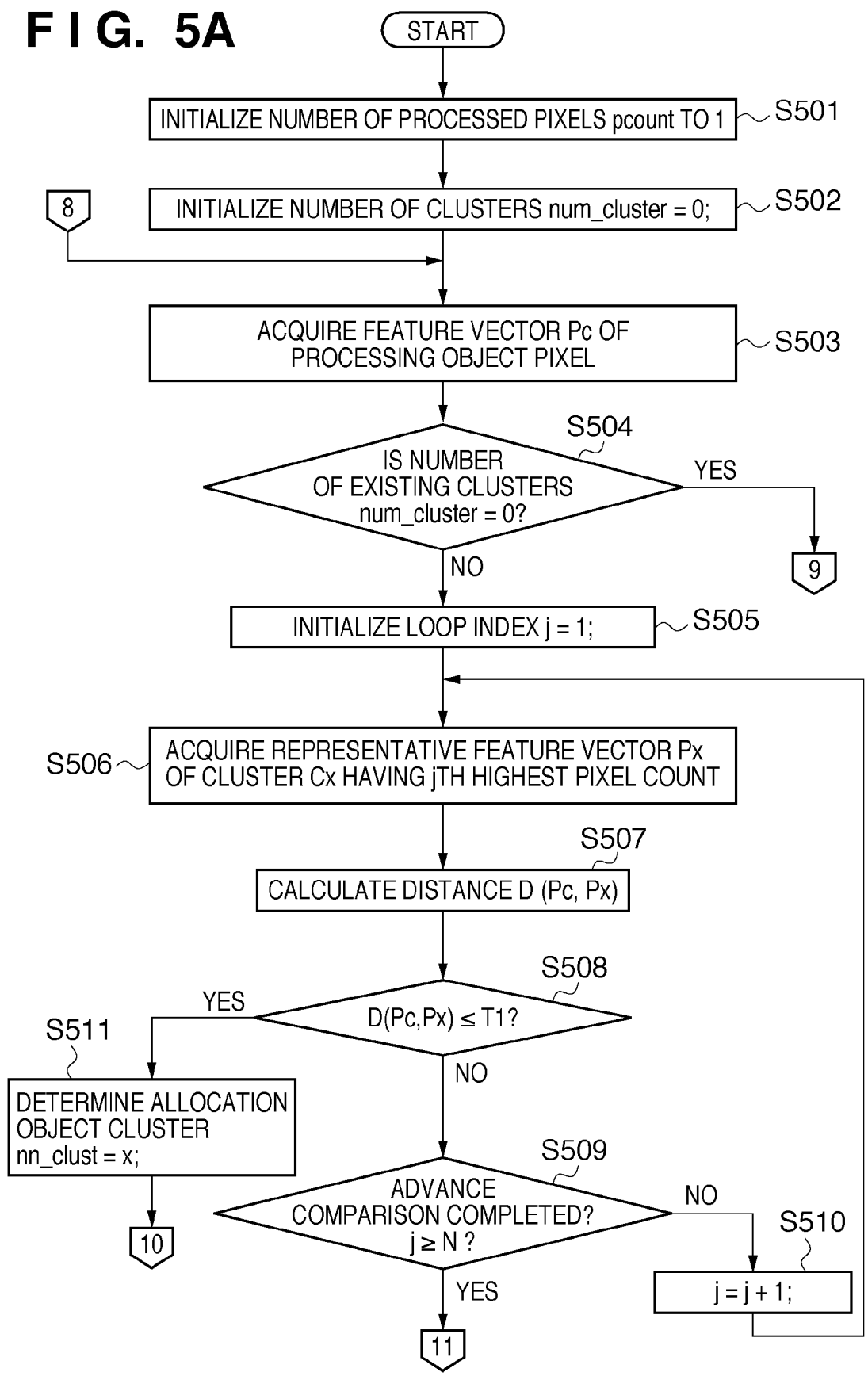
Figure 6A:
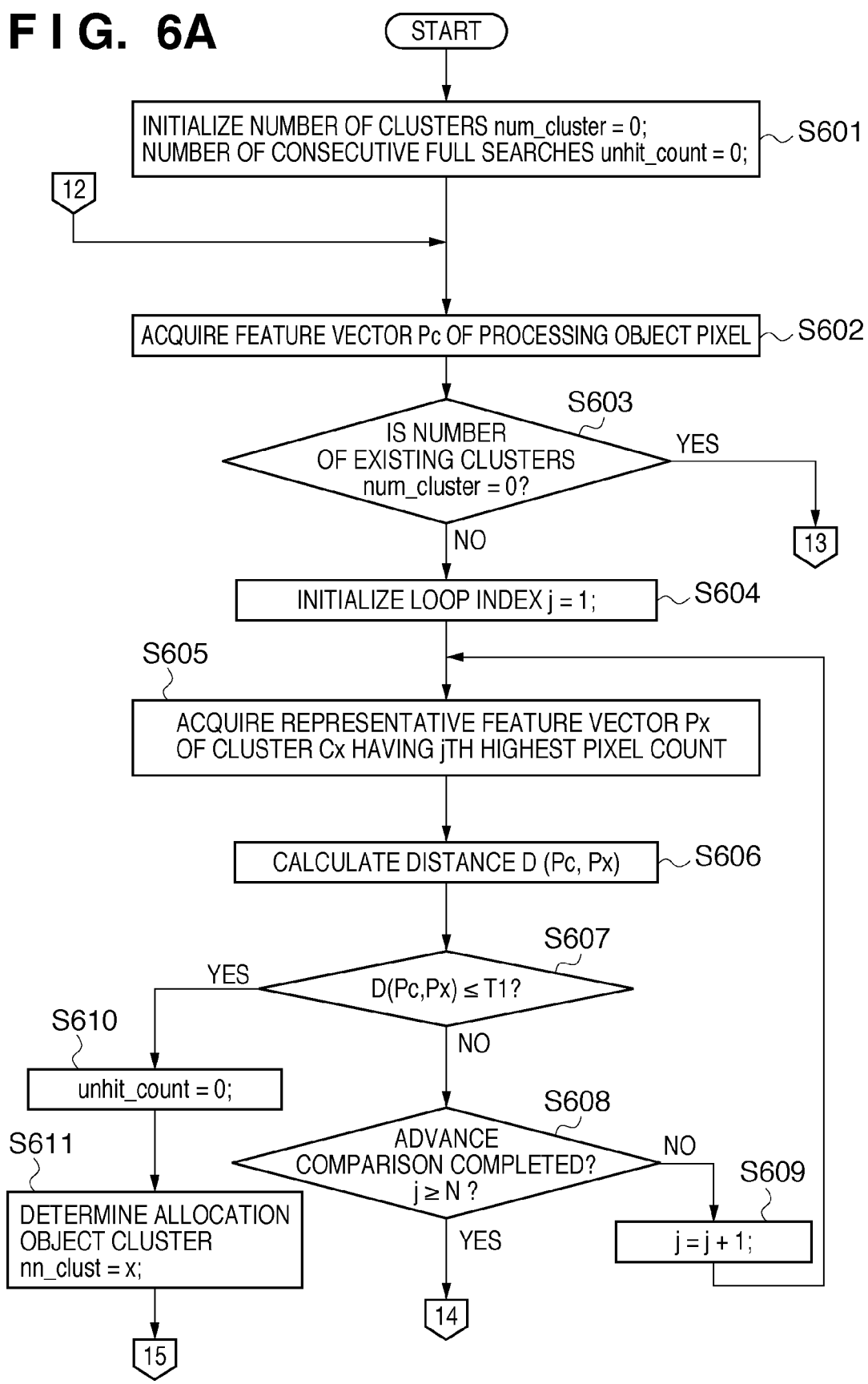
FIG. 6A and FIG. 6B are flowcharts illustrating operations of an image processing method according to a sixth embodiment.
Figure 6B:
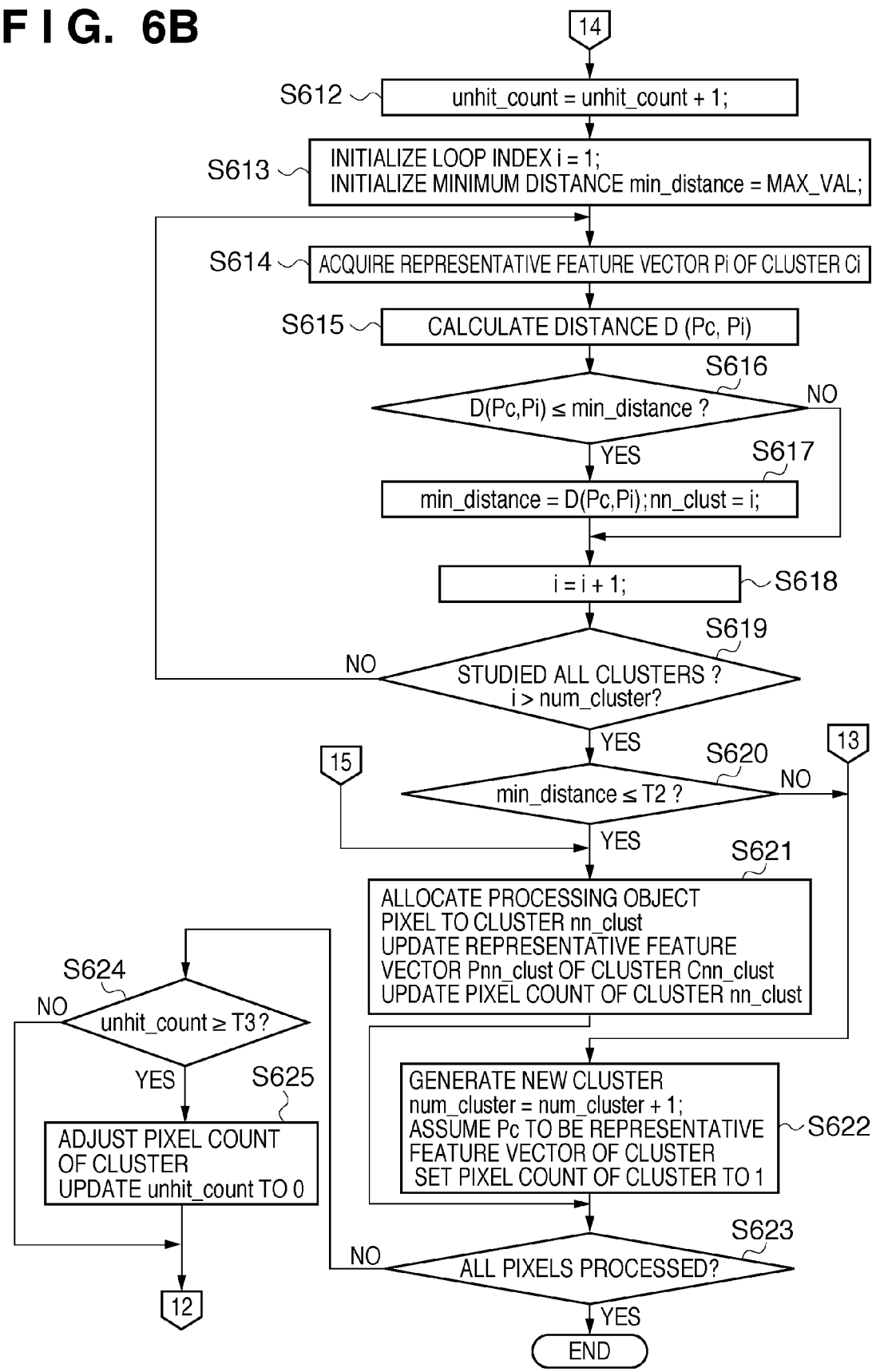

Moreover, while steps S111 to S117 in FIGS. 1A and 1B assume all existing clusters as objects, by saving a minimum value among first distances of respective clusters calculated in steps S105 to S108, there is no more need to recalculate distances between a representative feature vector of a cluster and the feature vector of a pixel of interest until arriving at an Nth cluster in a descending order of the numbers of pixels belonging to clusters.

[Second Embodiment]

An image processing method according to a second embodiment and a configuration of a vector data converting apparatus using the image processing method will now be described. FIG. 7 illustrates a configuration of the vector data converting apparatus which is the same as that described in the first embodiment of the present invention. The processes performed by a contour extracting unit 702 and a vector data generating unit 703 are the same as those performed by the vector data converting apparatus described in the first embodiment. A clustering unit 701 applies the image processing method according to the present embodiment to perform region splitting on an image. Hereinafter, operations of the clustering unit 701 according to the present embodiment will now be described in detail with reference to the flowcharts illustrated in FIGS. 2A and 2B.

In step S201, the number of clusters num_cluster and representative feature vectors of respective clusters are set, and a pixel count is set to 0. Since a method of defining the number of clusters k and a representative feature vector initial value of each cluster is known in the K-means clustering method in conventional art, a description thereof will be omitted.

A feature vector Pc of a processing object pixel is acquired (step S202). A feature vector is an RGB value of a pixel.

An advance comparison is performed in steps S203 to S209. A full search is performed in steps S210 to S216. Since the processes are the same as those of steps S104 to S117 of the image processing method according to the first embodiment (FIGS. 1A and 1B) of the present invention, a description thereof will be omitted.

In step S217, a processing object pixel is allocated to a cluster nn_clust and a pixel count is updated. A determination is made on whether or not processing of all pixels has been completed (step S218). If so (YES in step S218), the processing operation proceeds to step S219. If not (NO in step S218), the processing returns to step S202 to set a subsequent pixel as a processing object pixel.

In step S219, representative feature vectors P1 to Pnum_cluster of num_cluster-number of clusters are respectively updated. In step S220, a determination is made regarding the representative feature vectors P1 to Pnum_cluster on whether or not the respective differences between values before and after update are within a predetermined value. If the difference between the aforementioned values is within the predetermined value for all clusters (YES in step S220), the processing of the clustering unit 701 is concluded. If not (NO in step S220), the processing operation returns to step S202 to recommence processing from the first (when processing is performed in a raster scan order, from the top left) pixel of the image data.

Figures 12A, 12B, 13:
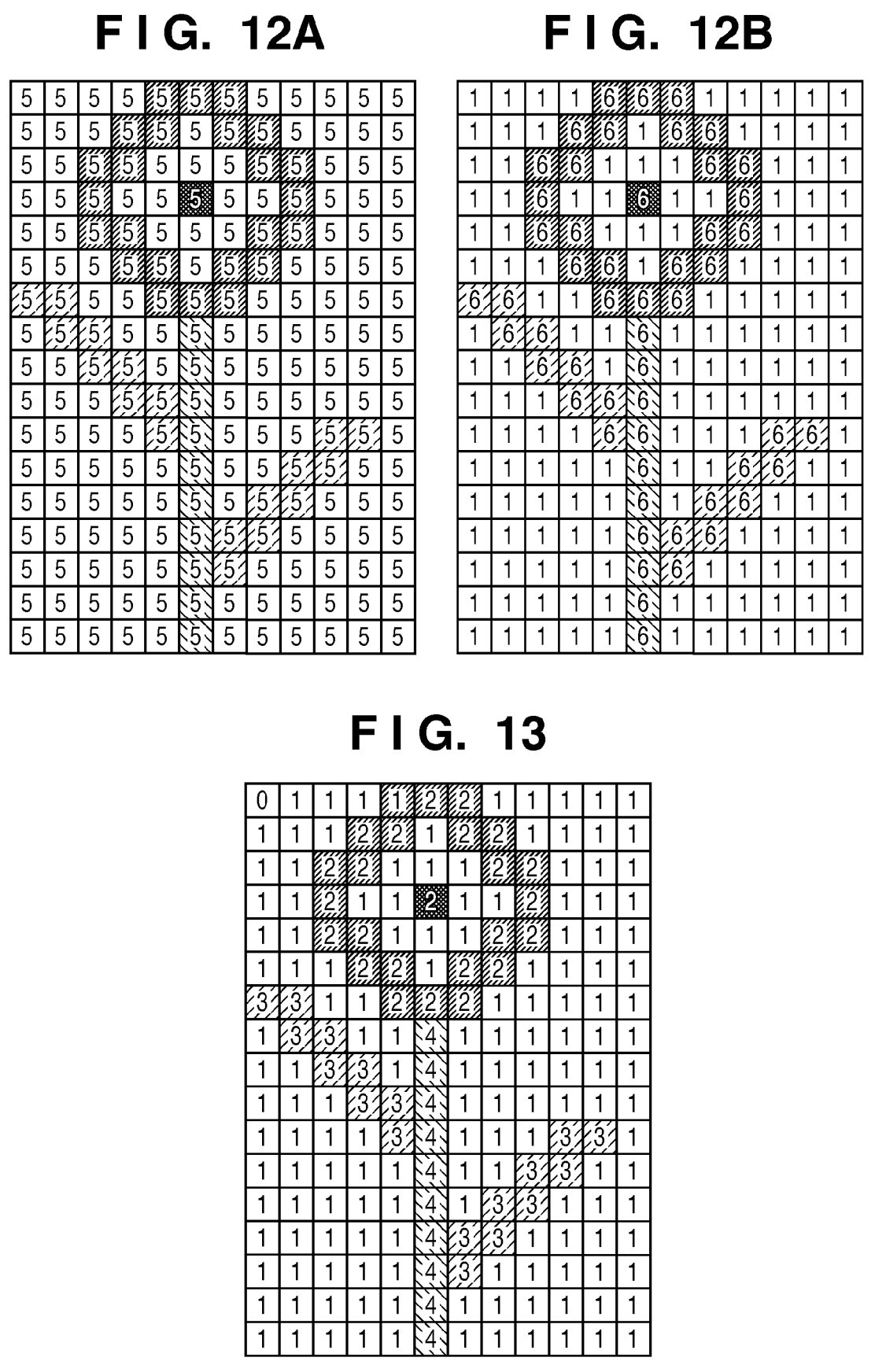

Advantages of the image processing method according to the present embodiment will be described with reference to FIGS. 12A and 12B. FIG. 12A illustrates the number of distance calculations per pixel when a conventional K-means clustering method is applied to the image illustrated in FIG. 8A. With a conventional method, distances between the feature vector of the processing object pixel and the representative feature vectors of all predefined clusters must be compared. Accordingly, 1,020 distance calculations are required.

On the other hand, in the image processing method according to the present embodiment, the representative feature vectors of N-number of clusters having large numbers of pixels are first compared with the feature vector of the processing object pixel. An image illustrated in FIG. 12B represents the number of distance calculations per pixel when the image processing method according to the present embodiment is applied to the image illustrated in FIG. 8A. The value of N is set to 1. In the image illustrated in FIG. 8A, a cluster 1 is the cluster that consistently has the highest pixel count throughout the entire process. Therefore, the cluster is to be set as an advance comparison object cluster. Over the entire image, a total of 151 pixels belong to cluster 1. For these pixels, since clusters to which the pixels belong are to be determined by advance comparison in one distance calculation, the number of distance calculations is 151. As for pixels belonging to other clusters, five distance calculations are to be performed by a full search after advance comparison. Therefore, a total of six distance calculations are to be performed on the 53 pixels belonging to clusters other than the cluster number 1. Accordingly, the number of distance calculations when the entire image is processed can be obtained from FIG. 12B as 469. In addition, when the number of clusters N to be subjected to advance comparison is set to 2, the number of distance calculations is 402. The number of distance calculations in the image processing method according to the present embodiment has been reduced by more than half compared to a conventional K-means clustering method. Therefore, clustering can be performed at a higher speed in comparison with a conventional method.

[Third Embodiment]

An image processing method according to a third embodiment and a configuration of a vector data converting apparatus using the image processing method will now be described. FIG. 7 illustrates a configuration of the vector data converting apparatus which is the same as that described in the first embodiment of the present invention. The processes performed by a contour extracting unit 702 and a vector data generating unit 703 are the same as those performed by the vector data converting apparatus described in the first embodiment. A clustering unit 701 applies the image processing method according to the present embodiment to perform region splitting on an image. Hereinafter, operations of the clustering unit 701 according to the present embodiment will now be described in detail with reference to the flowchart illustrated in FIG. 3.

A variable num_cluster representing the number of clusters is initialized to 0 (step S301). A feature vector Pc of an object pixel of clustering (hereinafter referred to as a "processing object pixel") is acquired (step S302).

A determination is made on whether or not clusters are predefined (step S303). If the number of predefined clusters is zero, (YES in step S303), the processing proceeds to step S314 to be described later. If there are predefined clusters (NO in step S303), comparisons between representative feature vectors of clusters and the feature vector of the processing object pixel are sequentially performed starting at a cluster having the highest pixel count (steps S304 to S311).

Steps S304 to S311 will now be described in detail. A loop index i and a variable min_distance are initialized (step S304). min_distance is a variable representing a minimum value among the distances between the feature vector of the processing object pixel and the representative feature vectors of the respective clusters. A value MAX_VALUE that is greater than the maximum possible distance in the feature space is set as an initial value of min_distance. A representative feature vector Px of a cluster Cx having the ith highest pixel count is acquired (step S305). A distance D (Pc, Px) between Pc and Px is calculated (step S306). The value of D (Pc, Px) is compared with the value of min_distance (step S307). If the value of D (Pc, Px) is greater than min_distance (NO in step S307), processing proceeds to step S310. If D (Pc, Px) is less than or equal to min_distance (YES in step S307), the value of min_distance is updated to D (Pc, Px) and nn_clust is updated to a cluster number i (step S308). nn_clust is a variable representing the cluster number of a cluster to which the processing object pixel should belong. The value of min_distance and the value of a threshold T1 are compared (step S309). If min_distance is less than or equal to T1 (YES in step S309), processing proceeds to step S313. If the value of min_distance is greater than T1 (NO in step S309), processing proceeds to step S310 and the loop index i is updated. A determination is made on whether or not comparisons with all clusters have been completed (step S311).

If not (NO in step S311), processing returns to step S305. If comparisons with all clusters have been completed (YES in step S311), the value of min_distance is compared with the value of a threshold T2 (step S312). The threshold T2 is a value used to determine whether to define a new cluster or to allocate the processing object pixel to a predefined cluster.

If min_distance is less than or equal to T2 (YES in step S312), the processing object pixel is allocated to the cluster nn_clust, the representative feature vector and the pixel count are updated (step S313), and the processing proceeds to step S315. If min_distance is greater than the threshold T2 (NO in step S312), a new cluster having the feature vector of the processing object pixel as a representative feature vector thereof is defined (step S314), and the processing proceeds to step S315. In step S315, a determination is made on whether or not processing on all pixels has been completed. If so (YES in step S315), the processing of the clustering unit 701 is concluded. If not (NO in step S315), the processing returns to step S302 to set a subsequent pixel as a processing object pixel.

Advantages of the image processing method according to the present embodiment will now be described in comparison to the image processing method according to the first embodiment. With the image processing method according to the first embodiment, comparisons between a processing object pixel and N-number of clusters are first performed starting with a cluster with the highest pixel count. If a cluster to which a pixel should belong is not determined by the comparisons, comparisons between the processing object pixel and all clusters are next performed to determine a cluster to which the pixel should belong. Therefore, with respect to pixels for which clusters to which the pixels should belong have not been determined by the first comparisons, two distance calculations are performed on N-number of clusters.

On the other hand, with the image processing method according to the present embodiment, comparisons between all clusters and the processing object pixel are performed starting with a cluster with the highest pixel count, and a cluster with the closest distance is searched. If the distance between the processing object pixel and a cluster is determined during the comparisons to be less than or equal to the threshold T1 (YES in step S309), the search is terminated and a cluster to which the processing object pixel should belong is determined. Therefore, distance calculations can be prevented from being doubly performed and the number of distance calculations can be further reduced as compared to the image processing method according to the first embodiment.

FIG. 13 illustrates the number of distance calculations per pixel when the image processing method according to the present embodiment is applied to the image illustrated in FIG. 8A. From FIG. 13, it is shown that the number of distance calculations for the entire image is 293. As shown in the description of the image processing method according to the first embodiment of the present invention, since the image processing method according to the first embodiment requires 401 distance calculations, it is obvious that a further reduction in the number of distance calculations has been achieved. Therefore, clustering can be performed at a higher speed in comparison with a conventional method.

<Fourth Embodiment>

An image processing method according to a fourth embodiment and a configuration of a vector data converting apparatus using the image processing method will now be described. FIG. 7 illustrates a configuration of the vector data converting apparatus which is the same as that described in the first embodiment of the present invention. The processes performed by a contour extracting unit 702 and a vector data generating unit 703 are the same as those performed by the vector data converting apparatus described in the first embodiment. A clustering unit 701 applies the image processing method according to the present embodiment to perform region splitting on an image. Hereinafter, operations of the clustering unit 701 according to the present embodiment will now be described in detail with reference to the flowchart illustrated in FIG. 4.

In step S401, the number of clusters num_cluster is determined, representative feature vectors of the respective clusters are set, and a pixel count is set to 0. While num_cluster=5 is set in an image processing method according to the present embodiment, the present invention is not limited to this arrangement and the value of num_cluster can take any value equal to or greater than 1. In the image processing method according to the present embodiment, an RGB color space is assumed as a feature space. In other words, a feature vector is expressed as an RGB value.

A feature vector Pc of an object pixel of clustering (hereinafter referred to as a "processing object pixel") is acquired (step S402), and the processing proceeds to step S403. Steps S403 to S410 are processes for sequentially comparing representative feature vectors of clusters with the feature vector of the processing object pixel starting with a cluster with the highest pixel count, and obtaining a minimum distance thereof. Since the processes are the same as those of steps S304 to S311 of the image processing method according to the third embodiment (FIG. 3), a description thereof will be omitted.

In step S411, a processing object pixel is allocated to a cluster nn_clust and a pixel count is updated. In step S412, a determination is made on whether or not all pixels have been processed.

Steps S413 and S414 are processes for updating the representative feature vectors of the respective clusters, and depending on the amount of change, determining whether to perform reprocessing starting at the pixel processed first or to terminate the operation of the clustering unit 701. Since steps S411 to S414 are the same as steps S217 to S220 of the image processing method according to the second embodiment (FIGS. 2A and 2B) of the present invention, a detailed description thereof will be omitted.

Advantages of the image processing method according to the present embodiment will now be described in comparison to the image processing method according to the second embodiment. Since the image processing method according to the present embodiment is similar to the image processing method according to the third embodiment in that there are no clusters on which distance calculations are doubly performed, the number of distance calculations can be further reduced as compared to the image processing method according to the second embodiment.

Figures 14, 15:
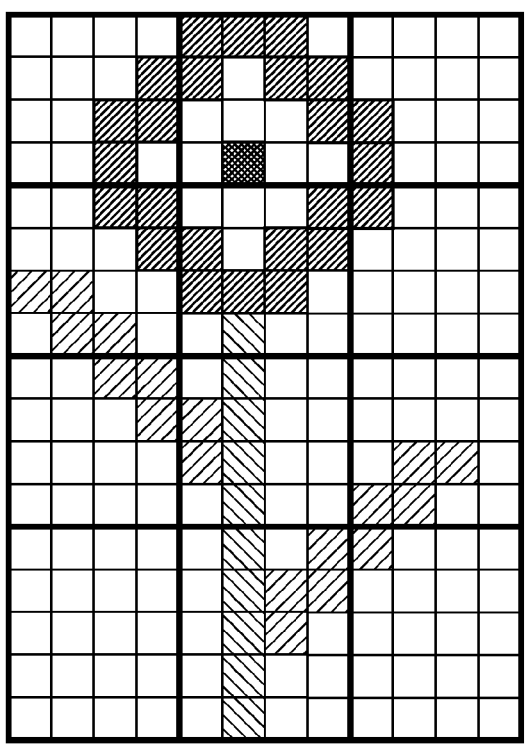
FIG. 14 is a diagram illustrating the numbers of distance calculations in the image processing method according to the fourth embodiment.
FIG. 15 is a diagram illustrating an inputting method to a clustering unit according to the fifth embodiment.

FIG. 14 illustrates the number of distance calculations per pixel when the image processing method according to the present embodiment is applied to the image illustrated in FIG. 8A. From FIG. 14, it is shown that the number of distance calculations for the entire image is 298. As already shown in the description of the image processing method according to the second embodiment of the present invention, the number of distance calculations according to the second embodiment of the present invention is 469. Therefore, it is obvious that a further reduction of the number of distance calculations has been achieved. Therefore, clustering can be performed at a higher speed in comparison with a conventional method.

<Fifth Embodiment>

An image processing method according to a fifth embodiment and a configuration of a vector data converting apparatus using the image processing method will now be described. FIG. 7 illustrates a configuration of a vector data converting apparatus which is the same as that described in the first embodiment of the present invention. The processes performed by a contour extracting unit 702 and a vector data generating unit 703 are the same as those performed by the vector data converting apparatus described in the first embodiment. Image data is inputted per pixel in a raster scan order starting from a top left pixel to a clustering unit 701 to which the image processing method according to the present embodiment is applied. However, the present invention is not limited to this arrangement. For example, image data may be inputted per pixel in a raster scan order on a block-by-block basis as illustrated in FIG. 15. Hereinafter, operations of the clustering unit 701 according to the present embodiment will now be described in detail with reference to the flowcharts illustrated in FIGS. 5A and 5B.

In step S501, a variable pcount representing the number of processed pixels is initialized to 1. A variable num_cluster representing the number of clusters is initialized to 0 (step S502), and processing proceeds to step S503.

Since steps S503 to S521 are processes for clustering a single pixel and are the same as steps S102 to S120 of the image processing method according to the first embodiment (FIGS. 1A and 1B), a description thereof will be omitted.

In step S522, a determination is made on whether a pixel count is to be adjusted or not. At this point, if the number of processed pixels pcount is equal to or greater than a certain threshold Tcount (YES in step S522), the processing proceeds to step S523. If not (NO in step S522), 1 is added to pcount (step S525) and processing returns to step S503. Tcount is a threshold used to determine whether a pixel count is to be adjusted or not according to the number of processed pixels. For example, when pixels are to be inputted per block as illustrated in FIG. 15 and a pixel count is to be adjusted per block, the number of pixels in each block (in the example illustrated in FIG. 15, 16 in the top 9 blocks and 20 in the remaining blocks) is set to the value of the threshold Tcount.

In step S523, a determination is made on whether or not processing on all pixels has been completed. If so (YES in step S523), processing of the clustering unit 701 is concluded. If not (NO in step S523), processing proceeds to step S524.

In step S524, the number of processed pixels pcount is updated to 1 and the pixel count of each cluster is adjusted. While the image processing method according to the present embodiment is arranged such that the pixel count of each cluster is to be adjusted to 0, an image processing method according to the present invention is not limited to this arrangement. For example, a pixel count may be set to ½ or ¼. The processing operation next returns to step S503.

The image processing method according to the present embodiment is particularly effective when partial characteristic tendencies of an image differ from location to location. For example, the image illustrated in FIG. 16A is an image in which a color appearing in an upper portion of the image completely differs from a color appearing in a lower portion of the image. When the image processing method according to the first embodiment which does not involve adjusting pixel counts is applied to FIG. 16A, since a cluster 1 (1601) is to be always subjected to an advance comparison, 58 distance calculations are required as illustrated in FIG. 16B. In contrast, when the image is divided into two blocks including a block 1602 and a block 1603 and a pixel count is reset to 0 for each clustering process per block (step S524), a cluster to which a processing object pixel should belong is also determined by advance comparison for block 1603. Therefore, the number of distance calculations now required in the image processing method according to the present embodiment is 30 as shown in FIG. 16C, which indicates that a significant reduction in the number of distance calculations has been achieved. Therefore, clustering can be performed at a higher speed in comparison with a conventional method.

As shown, the pixel counts of all clusters are reset to the same value every time clustering of an image block having a certain number of pixels is completed. Therefore, with respect to image data in which pixels with similar characteristics are locally concentrated, advance comparison increases the number of pixels for which classification to clusters can be completed, thereby enabling clustering to be performed at high speed.

<Sixth Embodiment>

An image processing method according to a sixth embodiment and a configuration of a vector data converting apparatus using the image processing method will now be described. FIG. 7 illustrates a configuration of a vector data converting apparatus which is the same as that described in the first embodiment of the present invention. The processes performed by a contour extracting unit 702 and a vector data generating unit 703 are the same as those performed by the vector data converting apparatus described in the first embodiment. A clustering unit 701 applies the image processing method according to the present embodiment to perform region splitting on an image. Hereinafter, operations of the clustering unit 701 according to the present embodiment will now be described in detail with reference to the flowcharts illustrated in FIGS. 6A and 6B.

A variable num_cluster representing the number of clusters and a variable unhit_count representing the number of pixels on which consecutive full searches have been performed are initialized to 0 (step S601). The number of pixels on which consecutive full searches have been performed may be restated as the number of pixels on which consecutive advance comparisons have failed. A feature vector Pc of a processing object pixel is acquired (step S602). In the image processing method according to the present embodiment, an RGB value of a pixel is to be used as a feature vector.

A determination is made on whether or not clusters are predefined (step S603). If the number of predefined clusters is zero, (YES in step S603), the processing operation proceeds to step S622 to be described later. If there are predefined clusters (NO in step S603), comparisons between representative feature vectors of a maximum of N-number of clusters and the feature vector of the processing object pixel are sequentially performed starting at a cluster having the greatest number of pixels belonging thereto (steps S604 to S612). In the image processing method according to the present embodiment, the value of N is set to 1. In addition, a mean value of feature vectors of pixels belonging to a cluster is to be used as the representative feature vector of the cluster.

Steps S604 to S612 will now be described in detail. A loop index j is initialized to 1 (step S604). A representative feature vector Px of a cluster Cx having the jth highest pixel count is acquired (step S605). A distance D (Pc, Px) between Pc and Px is calculated (step S606). In the image processing method according to the present embodiment, a Euclidean distance is calculated. D (Pc, Px) is compared with a threshold T1 (step S607). If D (Pc, Px) is less than or equal to T1 (YES in step S607), unhit_count is updated to 0 (step S610). The value of a variable nn_clust representing a cluster number of a cluster to which the processing object pixel should belong is updated to a cluster number x (step S611), and processing proceeds to step 621 to be described later. If the value of D (Pc, Px) is greater than T1 (NO in step S607), a determination is made on whether comparisons with the N-number of clusters has been completed (step S608). If not (NO in step S608), the loop index j is updated (step S609), and processing returns to step S605. If there are no clusters whose value of the distance D (Pc, Px) to the processing object pixel is less than or equal to T1 among the N-number of clusters (YES in step S608), 1 is added to unhit_count which represents the number of pixels on which consecutive advance comparisons have failed (step S612), and processing proceeds to step S613.

A full search is performed in steps S613 to S619. Since the processes are the same as those of steps S104 to S111 of the image processing method according to the first embodiment (FIGS. 1A and 1B) of the present invention, a description thereof will be omitted.

In step S620, the value of min_distance is compared with the value of a threshold T2. The threshold T2 is a value used to determine whether to define a new cluster or to allocate the processing object pixel to a predefined cluster.

If min_distance is less than or equal to T2 (YES in step S620), the processing object pixel is allocated to a cluster nn_clust having a representative feature vector whose distance is closest, and the representative feature vector and a pixel count are updated (step S621). The processing next proceeds to step S623. If min_distance is greater than T2 (NO in step S621), a new cluster having the feature vector of the processing object pixel as a representative feature vector thereof is defined (step S622), and the processing proceeds to step S623. In step S623, a determination is made on whether or not processing on all pixels has been completed. If so (YES in step S623), processing of the clustering unit 701 is concluded. If not (NO in step S623), a determination is made on whether or not unhit_count is equal to or greater than a threshold T3 (step S624). The threshold T3 is a value used to determine whether or not a pixel count is to be adjusted. If unhit_count is equal to or greater than T3 (YES in step S624), the processing proceeds to step S625. If unhit_count is smaller than T3, the processing returns to step S602 to set a subsequent pixel as a processing object pixel.

In step S625, unhit_count which represents the number of pixels on which consecutive advance comparisons have failed is updated to 0 and the pixel count of each cluster is adjusted. While the pixel counts of all clusters are adjusted to 0 in the present embodiment, an image processing method according to the present embodiment is not limited to this arrangement. For example, a pixel count may be adjusted to ½ or ¼. The processing then returns to step S602 to process the subsequent pixel.

FIG. 17 illustrates the number of distance calculations per pixel when the image processing method according to the present embodiment is applied to the image illustrated in FIG. 16A. The value of the threshold T3 is set to 3. FIG. 17 shows that in the image processing method according to the present embodiment, the number of distance calculations performed over the entire image is 34. On the other hand, as already shown in the description of the image processing method according to the fifth embodiment of the present invention, the number of distance calculations to be performed on the image illustrated in FIG. 16A according to the image processing method of the first embodiment is 58. Accordingly, it is apparent that the image processing method according to the present embodiment can reduce the number of distance calculations. Therefore, when there are a certain number of consecutive pixels that cannot be classified to clusters by advance comparison, the pixel counts of all clusters are reset to the same value. As a result, with respect to image data in which pixels with similar characteristics are locally concentrated, advance comparison increases the number of pixels for which classification to clusters can be completed, thereby enabling clustering to be performed rapidly. In addition, while a predetermined number of block sizes are decided in the fifth embodiment, the present embodiment is arranged so as to determine that an image characteristic has been altered when the number of advance comparison failures reach a certain number. Therefore, even when the shapes of blocks of pixels having common characteristics are indeterminate, the number of pixels classified into clusters can be increased by advance comparison, thereby enabling clustering at high speed.

<Other Embodiments>

Aspects of the present invention can also be realized by a computer of a system or apparatus (or devices such as a CPU or MPU) that reads out and executes a program recorded on cm a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-029116, filed Feb. 10, 2009, which is hereby incorporated by reference herein in its entirety.

What is claimed is:

1. An image processing method for clustering image data per pixel using a computer, the method comprising:
a first attribution determining step of comparing, by setting predefined clusters in a descending order of the number of pixels belonging thereto as objects, a first distance that is the distance between a feature vector of a processing object pixel and a representative feature vector of an object cluster with a first threshold, and storing the processing object pixel in a memory as a pixel belonging to the object cluster when determining that the first distance is less than or equal to the first threshold;
a second attribution determining step of comparing, when it is determined in said first attribution determining step that there are no clusters for which the first distance is less than or equal to the first threshold, a second distance that is a minimum value among distances between the feature vector of the processing object pixel and respective representative feature vectors of the predefined clusters with a second threshold, and storing the processing object pixel in the memory as a pixel belonging to a cluster corresponding to the second distance when the second distance is less than or equal to the second threshold; and
a third attribution determining step of defining a new cluster when the processing object pixel has not been stored as a pixel belonging to any of the predefined clusters in said first attribution determining step and said second attribution determining step, and storing the processing object pixel in the memory as a pixel belonging to the new cluster.

2. The image processing method according to claim 1, wherein said first attribution determining step includes sequentially comparing the first distance and the first threshold for clusters in a descending order of the number of pixels belonging thereto and up to a predetermined Nth cluster, and storing the processing object pixel as a pixel belonging to an object cluster when the first distance is determined to be less than or equal to the first threshold.

3. The image processing method according to claim 1, wherein said first attribution determining step includes sequentially comparing the first distance and the first threshold for clusters in a descending order of the number of pixels belonging thereto until comparisons for all predefined clusters are completed, and storing the processing object pixel as a pixel belonging to the object cluster when the first distance is determined to be less than or equal to the first threshold.

4. The image processing method according to claim 3, wherein
said first attribution determining step further includes storing a minimum value of the compared first distances, and
said second attribution determining step includes determining a cluster to which the processing object pixel should belong based on the minimum value stored in said first attribution determining step.

5. The image processing method according to claim 1, wherein the value of the first threshold is smaller than the value of the second threshold.

6. The image processing method according to claim 1, further comprising:
   counting the number of pixels belonging to a cluster and generating a count representing the number of counted pixels every time the processing object pixel is stored as a pixel belonging to the cluster; and
   resetting counts of pixels belonging to clusters for all clusters every time clusters to which a certain number of pixels belong are determined.

7. The image processing method according to claim 1, further comprising counting the number of pixels belonging to a cluster and generating a count representing the number of counted pixels every time the processing object pixel is allocated to the cluster, and wherein said first attribution determining step includes resetting, for all clusters, a count of pixels belonging to the cluster when there is a certain number of consecutive pixels for which the first distance is greater than the first threshold.

8. An image processing method for clustering image data per pixel to any of a plurality of predefined clusters using a computer, the method comprising:
   a first attribution determining step of comparing, by setting the plurality of clusters in a descending order of the number of pixels belonging thereto as objects, a first distance that is the distance between a feature vector of a processing object pixel and a representative feature vector of an object cluster with a first threshold, and storing the processing object pixel in a memory as a pixel belonging to the object cluster when it is determined that the first distance is less than or equal to the first threshold; and
   a second attribution determining step of storing the processing object pixel in the memory as a pixel belonging to a cluster for which the distance between the feature vector of the processing object pixel and a representative feature vector of the cluster takes a minimum value among the plurality of clusters when it is determined in said first attribution determining step that there are no clusters for which the first distance is less than or equal to the first threshold.

9. The image processing method according to claim 8, wherein said first attribution determining step includes sequentially comparing the first distance and the first threshold for clusters in a descending order of the number of pixels belonging thereto and up to a predetermined Nth cluster, and storing the processing object pixel in a memory as a pixel belonging to the object cluster when the first distance is determined to be less than or equal to the first threshold.

10. The image processing method according to claim 8, wherein said first attribution determining step includes sequentially comparing the first distance and the first threshold for clusters in a descending order of the number of pixels belonging thereto until comparisons for all predefined clusters are completed, and storing the processing object pixel in a memory as a pixel belonging to the object cluster when the first distance is determined to be less than or equal to the first threshold.

11. The image processing method according to claim 10, wherein
   said first attribution determining step further includes storing a minimum value of the compared first distances, and
   said second attribution determining step includes determining a cluster to which the processing object pixel belongs based on the minimum value stored in said first attribution determining step.

12. The image processing method according to claim 8, further comprising:
   counting the number of pixels belonging to a cluster and generating a count representing the number of counted pixels every time the processing object pixel is stored as a pixel belonging to a cluster; and
   resetting counts of pixels belonging to clusters for all clusters every time clusters to which a certain number of pixels belong are determined.

13. The image processing method according to claim 8, further comprising counting the number of pixels belonging to a cluster and generating a count representing the number of counted pixels every time the processing object pixel is stored as a pixel belonging to a cluster; and said first attribution determining step includes resetting, for all clusters, a count of pixels belonging to a cluster when there is a certain number of consecutive pixels for which the first distance is greater than the first threshold.

14. An image processing apparatus that clusters image data per pixel, comprising:
   a memory;
   a first attribution determining unit configured to compare, by setting predefined clusters in a descending order of the number of pixels belonging thereto as objects, a first distance that is the distance between a feature vector of a processing object pixel and a representative feature vector of an object cluster with a first threshold, and store the processing object pixel in said memory as a pixel belonging to the object cluster when it is determined that the first distance is less than or equal to the first threshold;
   a second attribution determining unit configured to compare, when it is determined by said first attribution determining unit that there are no clusters for which the first distance is less than or equal to the first threshold, a second distance that is a minimum value among distances between the feature vector of the processing object pixel and respective representative feature vectors of the predefined clusters with a second threshold, and store the processing object pixel in said memory as a pixel belonging to a cluster corresponding to the second distance when the second distance is less than or equal to the second threshold; and
   a third attribution determining unit configured to define a new cluster when the processing object pixel has not been stored as a pixel belonging to any of the predefined clusters by said first attribution determining unit and said second attribution determining unit, and store the processing object pixel in said memory as a pixel belonging to the new cluster.

15. An image processing apparatus that clusters image data per pixel to any of a plurality of predefined clusters, the apparatus comprising:
   a first attribution determining unit configured to compare, by setting the plurality of clusters in a descending order of the number of pixels belonging thereto as objects, a first distance that is the distance between a feature vector of a processing object pixel and a representative feature vector of an object cluster with a first threshold, and store the processing object pixel in a memory as a pixel belonging to the object cluster when it is determined that the first distance is less than or equal to the first threshold; and
   a second attribution determining unit configured to store the processing object pixel in the memory as a pixel belonging to a cluster for which the distance between the feature vector of the processing object pixel and a representative feature vector of the cluster takes a minimum value among the plurality of clusters when it is determined by said first attribution determining unit that there are no clusters for which the first distance is less than or equal to the first threshold.

16. A non-transitory computer-readable medium on which is recorded a program for executing an image processing method for clustering image data per pixel using a computer, the method comprising:

a first attribution determining step of comparing, by setting predefined clusters in a descending order of the number of pixels belonging thereto as objects, a first distance that is the distance between a feature vector of a processing object pixel and a representative feature vector of an object cluster with a first threshold, and storing the processing object pixel in a memory as a pixel belonging to the object cluster when it is determined that the first distance is less than or equal to the first threshold;

a second attribution determining step of comparing, when it is determined in said first attribution determining step that there are no clusters for which the first distance is less than or equal to the first threshold, a second distance that is a minimum value among distances between the feature vector of the processing object pixel and respective representative feature vectors of the predefined clusters with a second threshold, and storing the processing object pixel in the memory as a pixel belonging to a cluster corresponding to the second distance when the second distance is less than or equal to the second threshold; and a third attribution determining step of defining a new cluster when the processing object pixel has not been stored as a pixel belonging to any of the predefined clusters in said first attribution determining step and said second attribution determining step, and storing the processing object pixel in the memory as a pixel belonging to the new cluster.

17. A non-transitory computer-readable medium on which is recorded a program for executing an image processing method for clustering image data per pixel to any of a plurality of predefined clusters using a computer, the method comprising:

a first attribution determining step of comparing, by setting the plurality of clusters in a descending order of the number of pixels belonging thereto as objects, a first distance that is the distance between a feature vector of a processing object pixel and a representative feature vector of an object cluster with a first threshold, and storing the processing object pixel in a memory as a pixel belonging to the object cluster when it is determined that the first distance is less than or equal to the first threshold; and a second attribution determining step of storing the processing object pixel in the memory as a pixel belonging to a cluster for which the distance between the feature vector of the processing object pixel and a representative feature vector of the cluster takes a minimum value among the plurality of clusters when it is determined in said first attribution determining step that there are no clusters for which the first distance is less than or equal to the first threshold.

* * * * *